United States Patent [19]
Bossler

[11] 3,886,840
[45] *June 3, 1975

[54] BOLT HEAD WHICH MEASURES AND MAINTAINS PRELOAD

[75] Inventor: Robert B. Bossler, Bloomfield, Conn.

[73] Assignee: Kaman Aerospace Corporation, Bloomfield, Conn.

[ * ] Notice: The portion of the term of this patent subsequent to May 28, 1991, has been disclaimed.

[22] Filed: June 22, 1973

[21] Appl. No.: 372,667

Related U.S. Application Data
[63] Continuation-in-part of Ser. No. 299,799, Oct. 24, 1972, Pat. No. 3,812,758.

[52] U.S. Cl. .................................. 85/62; 73/88 F
[51] Int. Cl. .............................................. G01l 5/00
[58] Field of Search ............ 85/61, 62; 73/88 F, 1 B

[56] References Cited
UNITED STATES PATENTS
3,812,758   5/1974   Bossler .................................. 85/62

Primary Examiner—Marion Parsons, Jr.
Attorney, Agent, or Firm—Cushman, Darby & Cushman

[57] ABSTRACT

A bolt providing an indication of pre-load and continuous load thereafter wherein the bolt head has recesses on both sides thereof leaving a central ring which functions as a diaphragm spring and deflects along the bolt axis as a function of load. In one embodiment, an indicator pin is mounted in or forms part of the ring so as to deflect with the ring, moving through a passage in a fixed indicator washer or ring which closes the top recess and which permits a ready determination, by comparison of the relative positions of pin and indicator ring, of bolt pre-load. A further embodiment of the pre-load indicating device eliminates the indicator pin and replaces the indicator washer with a transverse buckled column, which indicates load along the bolt axis by the deflected location of the buckled column. In a third embodiment both an indicator pin, which deflects with the ring, and a transverse buckled column are employed to increase sensitivity as the column and pin move in opposite directions with change in load.

8 Claims, 7 Drawing Figures

BOLT HEAD WHICH MEASURES AND MAINTAINS PRELOAD

This application is a continuation-in-part of Ser. No. 299,799 filed Oct. 24, 1972 now U.S. Pat. No. 3,812,758.

BRIEF DESCRIPTION OF THE PRIOR ART AND SUMMARY OF THE INVENTION

The invention relates to a bolt which provides an indication of pre-load and which thereafter provides a continuous indication of bolt load.

Most bolts are normally installed with an initial tension, usually called pre-load. The purpose of this bolt pre-load is to reduce cyclic loading from external loads to a level at which the bolt can survive indefinitely. It is desirable to apply as high a pre-load as possible in order to make sure that the pre-load is maintained so long as the bolt remains in use. Obviously, it is desirable to choose the upper limit larger than the external load, or the life of the bolt will be limited.

There are a number of techniques now in use for measuring bolt pre-load. The simplest way is to measure the torque applied during installation by a torque wrench or the like. However, variations in friction and wrench accuracy result in a large variation in pre-load applied by this technique. A 25% variation in pre-load with a torque wrench has been observed. With this variation, the highest possible pre-load range is roughly 60 to 100% of yield strength. Therefore, a repeated external load of 70% yield strength can cause failure of a bolt whose pre-load is determined by wrench torque. If the pre-load range is increased from 80 to 100% yield strength, the same bolt will have an infinite life with the same repeated external load of 70% yield strength.

Other methods of measuring pre-load now in use have higher accuracy than wrench torque but are still not completely satisfactory. One method now used involves a pre-load indicating washer comprising a trapped metal ring which is crushed in a clearly indicated manner at a known load during installation. This approach, however, does not show if the desired pre-load has been exceeded and may not show reliably if the pre-load has been lost after a period of time and use. In addition, the assembly is not re-usable since the trapped metal ring is essentially destroyed.

Another bolt now used has a small hole along its axis for most of the length of the bolt, through which an indicating pin fits which is anchored near the thread end so as to protrude past the head end of the bolt. As the bolt stretches under load during installation, the pin retracts until it is flush with the bolt head at the desired pre-load. This method shows if pre-load has been reached or exceeded, and if the pre-load has been maintained. However, the axial hole weakens the bolt, and the system does not work well for short bolts where the bolt stretch under load is extremely small.

Another method of determining pre-load now in use is by measuring bolt stretch under load with a micrometer. Again, a short bolt has an extremely small stretch and this requires measurement accuracy beyond the capability of a conventional hand-held micrometer. Further, many installations are not accessible to micrometer measurement. Another method which is occasionally employed is to intall heated bolts. With this technique, however, accurate pre-load control is difficult and loss of pre-load is not indicated.

The present invention relates to a bolt in which measurement of pre-load is highly accurate, which indicates if pre-load has been exceeded or lost, which requires no special tools or expensive procedures and which is independent of bolt length, assembly friction, and assembly torque measurement. In addition, the pre-load measuring structure does not affect the overall strength of the bolt.

Pre-load is retained when the bolt is stretched elastically more than the clamped member compresses with time and use. Maintaining pre-load at a desired level can be difficult for short bolts because the elastic stretch of such bolts is normally quite small. Pre-load on a short bolt can be lost by gradual embedding in the clamped member, plastic deformation of a gasket, creeping of soft-plated coatings, fretting erosion of faying surfaces, or material yielding at elevated temperatures. Maintaining pre-load at a desired level can be difficult even for a long bolt if an elastically deformed part which has a low spring rate is clamped. The bolt of this invention has a very low spring rate so as to satisfactorily maintain pre-load independent of bolt length or normal plastic or elastic deformation of clamped members.

As described in detail below, the novel bolt of this invention is comprised of a bolt member having a shaft portion which terminates in a bolt head. Recesses are provided on either side of the bolt head to form a thin circular ring which functions as a diaphragm spring and which deflects along the axis of the bolt shaft as the load is decreased and increased. In one embodiment, an indicator pin is mounted in or forms part of the bolt head with a portion extending outward from the top of the bolt, so that the pin deflects along the bolt axis with the circular ring. A non-deflecting indicator washer is mounted about the periphery of the upper recess with the pin extending through a central passage therein so that the load on the bolt can be readily determined by comparing the positions of the nondeflecting indicator-washer and the pin which deflects with the circular ring formed between the two recesses.

Another indicating device uses a buckled column mounted within the upper bolt head recess rather than the indicator pin and indicator washer described above. Increasing load on the bolt causes the buckled column to deflect further, so that the load on the bolt can be determined by comparing the location of the buckled column to a reference surface, such as the top surface of the bolt head. The upper recess may be substantially filled with a flexible material, or may be partially covered with a shield, or may be wholly covered with a removable shield, in order to protect the buckled column from damage.

According to a third embodiment, an indicator pin deflecting with the ring extends through a buckled column which deflects oppositely with the ring to increase sensitivity of the indicator.

Many other objects and purposes of the invention will become clear from the following detailed description of the drawings.

DETAILED DESCRIPTION OF THE DRAWINGS

Figure 1:
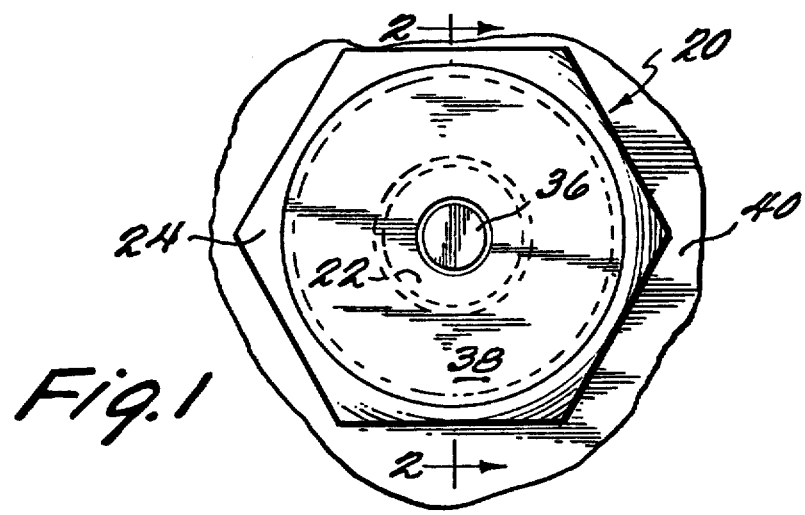
FIG. 1 shows a top view of one embodiment of the novel bolt of this application.
Figure 2:
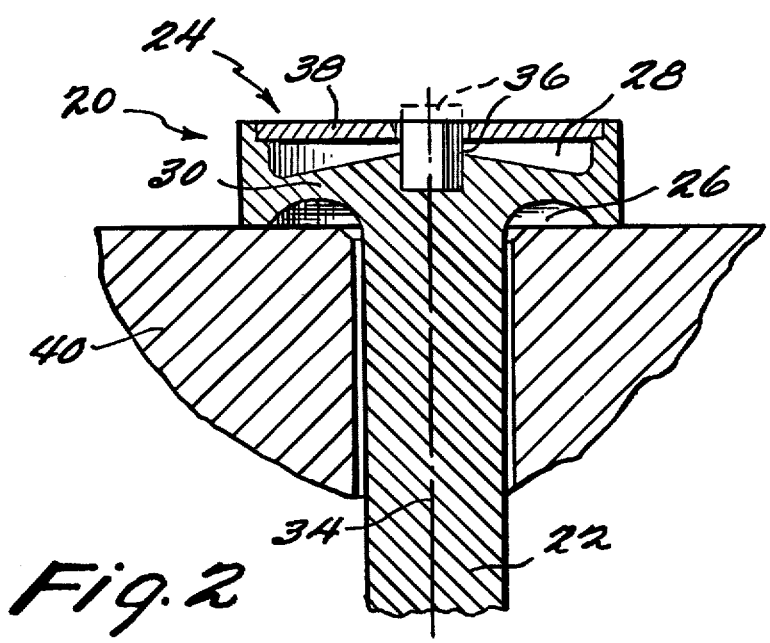
FIG. 2 shows a cut-away view of the bolt of FIG. 1 along the lines 2—2.

Reference is now made to FIGS. 1 and 2 which illustrate one embodiment of the novel bolt of this application. As described briefly above, bolt 20 includes a shaft portion 22 which terminates in a bolt head indicated as 24. Bolt head 24 is provided with two recesses 26 and 28 on opposite sides, leaving a thin circular ring 30 between the two recesses which functions and behaves as a diaphragm spring with a relatively low spring rate compared to the bolt shaft.

Recess 26 is formed by an annular concave surface which can be partially or fully recessed within the bolt head. The transverse curvature of recess 26 can be of any desirable shape such as a circular arc of large radius; for example, a radium of one-third of a bolt diameter has proven satisfactory. Upper recess 28 has a depth which may vary to provide desirable stress distribution in circular ring 30 when the bolt is loaded. Since circular ring 30 behaves like a diaphragm spring, increases and decreases of a load, including pre-load, cause deflection of ring 30 along axis 34 of bolt 20. The low spring rate provides a relatively large deflection for a given pre-load or load.

An indicator pin 36 is mounted in the upper surface of ring 30 as shown or forms an upward extension of ring 30 so that pin 36 deflects with ring 30 along axis 34. Pin 36 is preferably cylindrical with its axis coinciding with axis 34.

Completing the assembly illustrated in FIGS. 1 and 2 is an indicator-washer 38 which is mounted at the periphery of the upper recess as shown, closing recess 28 and being relatively non-deflecting with respect to ring 30, so that the relative position of indicator pin 36 and indicator-washer or ring 38 is a function of pre-load or load.

Preferably, indicator pin 36 and the indicator-washer 38 are ground flush during manufacture while a known tension load is applied to the bolt threads. Thus, when the load is removed, pin 36 will protrude above indicator-washer 38 as indicated in dashed lines in FIG. 2. When the bolt is installed against a clamped member 40, the bolt can be simply tightened until indicator pin 36 is flush with the adjacent surface of indicator-washer 38. The location of pin 36 with respect to washer 38 can be visually observed or felt with any convenient straight edge, or optically, or electrically or by simply scraping with a fingernail or the like.

Figure 3:
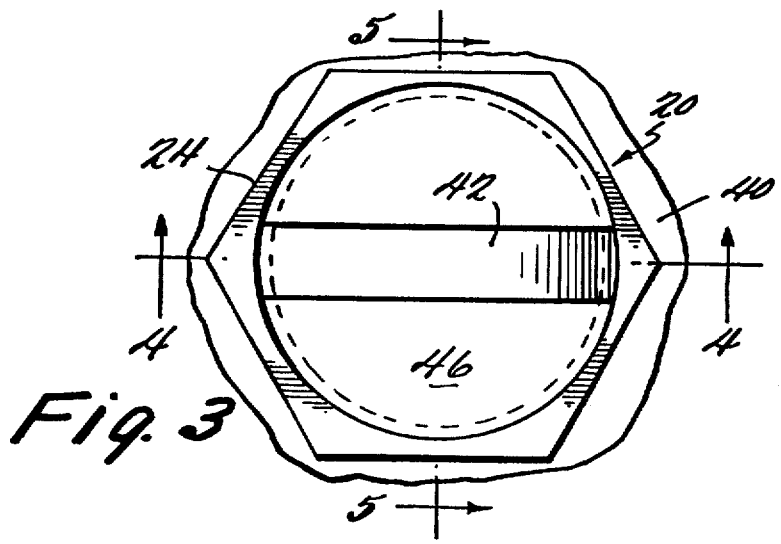
FIG. 3 shows a top view of a second embodiment of the novel bolt of this application.
Figure 4:
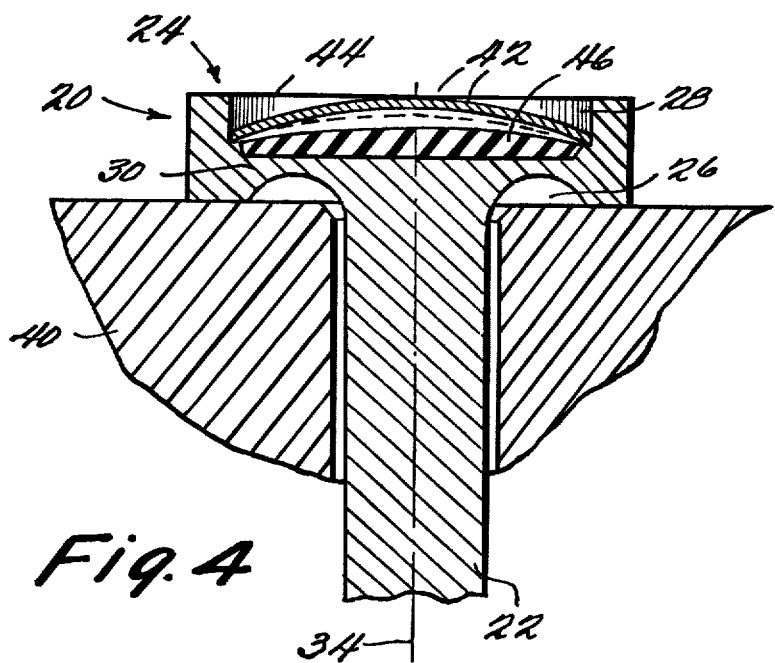
FIG. 4 shows a cut-away view of the bolt of FIG. 3 along the line 4—4.
Figure 5:
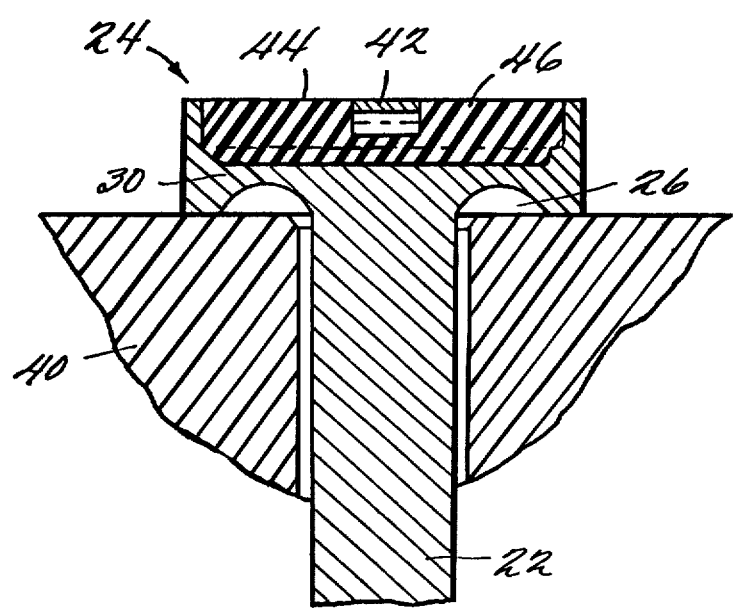
FIG. 5 shows a cut-away view of the bolt of FIG. 3 along the line 5—5.

Reference is now made to FIGS. 3, 4 and 5 which illustrate a second embodiment of the novel bolt of this application. The second embodiment differs from the first embodiment only by the method of indicating bolt load. A buckled column 42 is mounted transversely in upper recess 28 of the bolt head as shown in FIGS. 3 and 4. The buckled column 42 deflects substantially in response to an axial load in the bolt. Preferably, buckled column 42 and the top surface 44 of the bolt head are ground flush during manufacture while a known tension load is applied to the bolt threads. Thus, when the load is removed, buckled column 42 will retract below the top surface 44 of the bolt head. When the bolt is installed against a clamped member 40, the bolt can be simply tightened until buckled column 42 is flush with the top surface 44 of the bolt head. The location of buckled column 42 with respect to the top surface 44 of the bolt head can be visually observed or felt with any convenient straight edge. The upper recess 28 of the bolt head is partially filled with a protective flexible material 46 as shown in FIGS. 4 and 5 to protect the buckled column from damage during normal use. The upper recess 28 can also be partially covered with a shield or wholly covered by a removable shield in order to protect buckled column 42 from damage.

The average mechanic can install the bolt and reproduce the tension applied during manufacture with an error of at most 10% without the use of any special tools or procedures. Any observer can tell if the pre-load has been exceeded or if the pre-load has been lost after a given period of time and use. The measured pre-load is independent of both length, assembly friction or the measurement of assembly torque. The pre-load is accomplished by a low rate spring which is part of the bolt, thus aiding maintenance of pre-load.

There are a number of other advantages to the particular arrangement described in FIGS. 1 through 5. Normally, a conventional high fatigue strength bolt requires a large cold worked fillet in the transition region between bolt shank to bolt head. This fillet is commonly a radius under the bolt head which in turn requires a special washer with a larger-than-normal center hole countersink so that the fillet radius does not bear on the edge of the hole. This special washer is unsatisfactory because it is special and because it can be installed upside down and damage the fillet. The fillet curvature recessed within the proposed oversize head in the embodiment of this invention can be larger than can be provided by conventional design, thus reducing the head-to-shank stress concentration factor and eliminating the necessity for a special thick countersunk washer. The larger fillet radius is more easily cold worked by rolling or shot-peening. The bolt head with the diaphragm spring ring 30 reduces stress caused by deviation from perpendicularity between the bolt head contact surface and the bolt hole.

The bolt head area is larger; therefore, bearing stresses under the bolt head are reduced. The bolt head bearing area is at a large radius, so that frictional torque is greater and more nearly self-locking than in conventional bolts. The bolt head bearing annulus is located at a radial distance from the hole, which may provide automatic sealing against leakage from the bolt hole. Further, the recessed cavity may also simplify sealing against leakage through the hole by permitting the use of an O-ring or the like within the cavity.

The bolt head cavity 26 further is a useful reservoir for various substances such as a bonding agent, or a lubricant or a sacrificial anodic agent which preserves the bolt in a corrosive environment. The bolt head profile is lower than a conventional high fatique-strength bolt head with the same shank diameter, which permits use in limited spaces.

The bolt head can be used to particular advantage when the clamped member loading is perpendicular to the bolt hole. Since the bolt head bears on an annular area of the clamped member at some radial distance from the hole, the radially offset ring load will tend to induce a compressive stress around the bolt hole in the clamped member. The compressive stress will reduce the stress concentration caused by a hole in a member loaded perpendicularly to the hole. Also the bolt head will bridge the hole which provides a load path in parallel with the clamped member, thus reducing the stress concentration at the hole.

The shape of the fillet curvature can be designed as desired to reduce stress and can be a circular arc, for example, with a radius of one-third the bolt shaft diameter, or some other shape than a circular arc. The fillet curvature shape in conjunction with the other portions of the bolt head is determined by rational stress analysis such as the finite element method in order to achieve the optimum stress reduction for any given desired bolt dimensions and materials.

Thus, the novel bolt of this application provides a simple manner to adjust bolt pre-load in place to any desired limit and provides a further check of the bolt pre-load throughout its life. No complex or expensive tools are required for installing the bolt, and it can be re-used many times. The bolt design is such that is does not deleteriously affect the stress characteristics required for the bolt to function properly.

Figure 6:
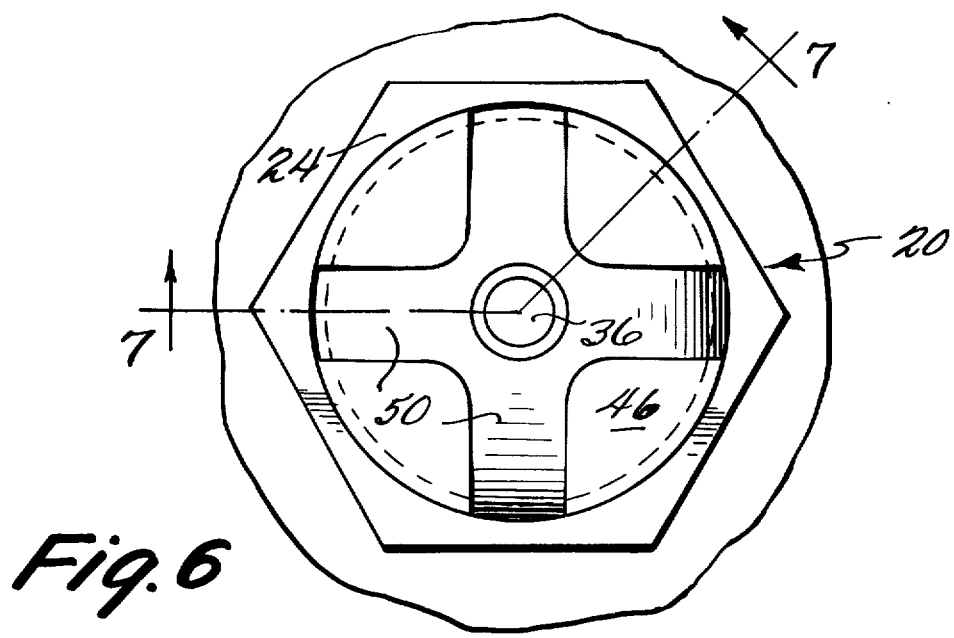
FIG. 6 shows a top view of a third embodiment of the novel bolt of this application.
Figure 7:
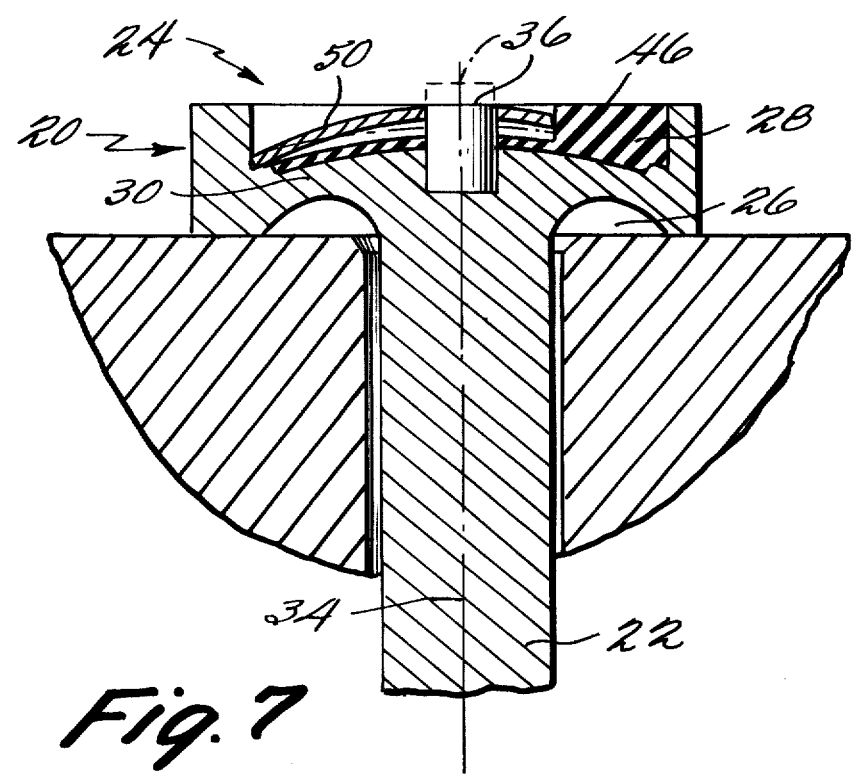
FIG. 7 shows a cut-away view of the bolt of FIG. 6 along the lines 7—7.

Reference is now made to FIGS. 6 and 7 in which the bolt head of FIGS. 1 and 2 is used except that indicator washer 38 is removed. A buckled column or disk 50 replaces indicator washer 38 with indicator pin 36 extending through a central passage in disk 50. Disk 50 may be substantially notched as shown on FIG. 6, and recess 28 may be partially filled with a protective material 46 to support and protect buckled disk 50. The upper recess 28 and the buckled disk 50 can also be partially covered with a shield or wholly covered by a removable shield in order to protect pin 36 and buckled disk 50.

Preferably, indicator pin 36 and the buckled disk 50 are ground flush during manufacture while a known tension load is applied to the bolt threads. Thus, when the load is removed, pin 36 will protrude above buckled disk 50 as indicated in dashed lines in FIG. 7. When the bolt is installed against a clamped member 40, the bolt can be simply tightened until indicator pin 36 is flush with the adjacent surface of buckled disk 50. The location of pin 36 with respect to disk 50 can be visually observed or felt with any convenient straight edge, or optically, or electrically or by simply scraping with a fingernail or the like.

The advantages described previously are retained. In addition, the vertical travel of the pin with respect to the disk will be increased compared to the configurations shown on FIGS. 1–5 because the disk buckles upward while the pin retracts downward. Further the transverse buckled column 42 of FIGS. 3, 4 and 5 could fail to indicate a significant bolt head deflection caused by a high spot on clamped member 40 or debris trapped under one edge of the bolt head. However, the disk 50 in FIGS. 6 and 7 will tend to average out and indicate all bolt head deflections.

Many changes and modifications of the above described embodiments of the invention can be, of course, made without departing from the scope thereof. Accordingly, that scope is intended to be limited only by the scope of the appended claims.

What is claimed is:

1. A bolt comprising:
    a first member having a shaft portion extending along a bolt axis and terminating in a head with a first annular recess on one side of said head between a surface for bearing against a clamped member and the juncture of said shaft and said head and a second annular recess on the opposite side of said head so as to define a ring between said recesses which deflects along the bolt axis with increasing and decreasing load and having an indicator pin with a portion joined to said defined ring for movement therewith and a portion extending out of said defined ring away from said shaft portion, and
    a transverse buckled column mounted in said second recess and having a central passage through which said indicator pin extends so that said column and indicator pin deflect in opposite directions with increasing and decreasing load and the relative position of said pin and said buckled column indicates the load on said bolt.

2. A bolt as in claim 1, wherein said first recess is concave, with the center of curvature falling on a line extending parallel to said bolt axis and said second recess extends from a maximum depth near the periphery of said head to a minimum depth near said bolt axis.

3. A bolt as in claim 2, wherein said pin is cylindrical with its axis coincident with said bolt axis.

4. A bolt as in claim 1, wherein said head has peripheral torque applying surfaces.

5. A bolt comprising:
    a first member having a shaft portion extending along a bolt axis and terminating in a head with a first annular recess on one side of said head between a surface for bearing against a clamped member and the juncture of said shaft and said head and a second annular recess on the opposite side of said head so as to define a ring between said recesses which deflects along the bolt axis with increasing and decreasing load and means joined to said defined ring for movement therewith so that the position thereof indicates the load on said bolt.

6. A bolt as in claim 5, wherein said first recess is concave, with the center of curvature falling on a line extending parallel to said bolt axis and said second recess extends from a maximum depth near the periphery of said head to a minimum depth near said bolt axis.

7. A bolt as in claim 6, wherein said means is cylindrical with its axis coincident with said bolt axis.

8. A bolt as in claim 5, wherein said head has peripheral torque applying surfaces.

* * * * *